Sheet 1, 2 Sheets.

W. F. Pratt.
Cotton Gin.
Nº 91,866. Patented Jun. 29, 1869.

Witnesses
Geo. D. Bancroft.
Frank G. Parker.

Inventor.
Wm. F. Pratt.

United States Patent Office.

WILLIAM F. PRATT, OF EAST BRIDGEWATER, MASSACHUSETTS, ASSIGNOR TO E. CARVER COMPANY, OF SAME PLACE.

Letters Patent No. 91,866, dated June 29, 1869.

IMPROVEMENT IN MACHINE FOR REMOVING LINT FROM COTTON-SEED.

The Schedule referred to in these Letters Patent and making part of the same.

*To all whom it may concern:*

Be it known that I, WILLIAM F. PRATT, of East Bridgewater, in the county of Plymouth, and State of Massachusetts, have invented a new and useful Machine for Removing the Down or Felt from the Cotton-Seed after it has been ginned; and I do hereby declare that the following is a full and exact description thereof, reference being had to the accompanying drawings, and to the letters of reference marked thereon.

To enable others skilled in the art to make and use my invention, I will proceed to describe its nature, construction, and use.

The nature of my invention consists in combining, with a series of circular saws and a hopper, a fluted roll, said roll serving, as it revolves, to turn the seed over and over, and thus cause all parts of them to be acted upon by the teeth of the saws, said action continuing until all the down or felting in which all tufted seeds are enveloped is removed, and the seed left bare.

Drawings.

Figure 2:
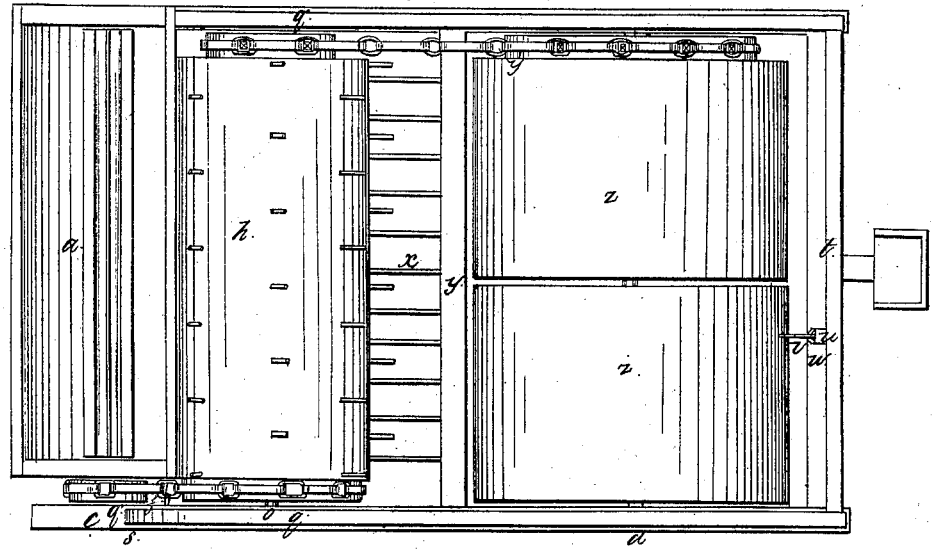
Figure 2 is a vertical section of the same.
Figure 3:
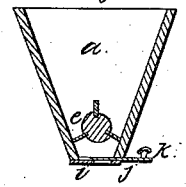
Figure 4:
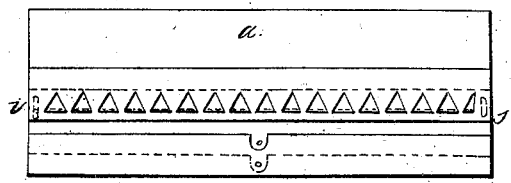

B, fig. 2, is a cylinder, provided with saws made and arranged on the drum or cylinder, as shown.

These saws project into the hopper E, through grate-bars D, as shown in fig. 2.

If desirable, the grate-bars may be dispensed with, and the saws be placed near to each other, in which case the saws themselves form one side of the hopper.

H is a fluted roller, extending lengthwise through the hopper. The journals of this roller extend through the ends of the hopper, and have attached to them pulleys L, fig. 1.

Figure 1:
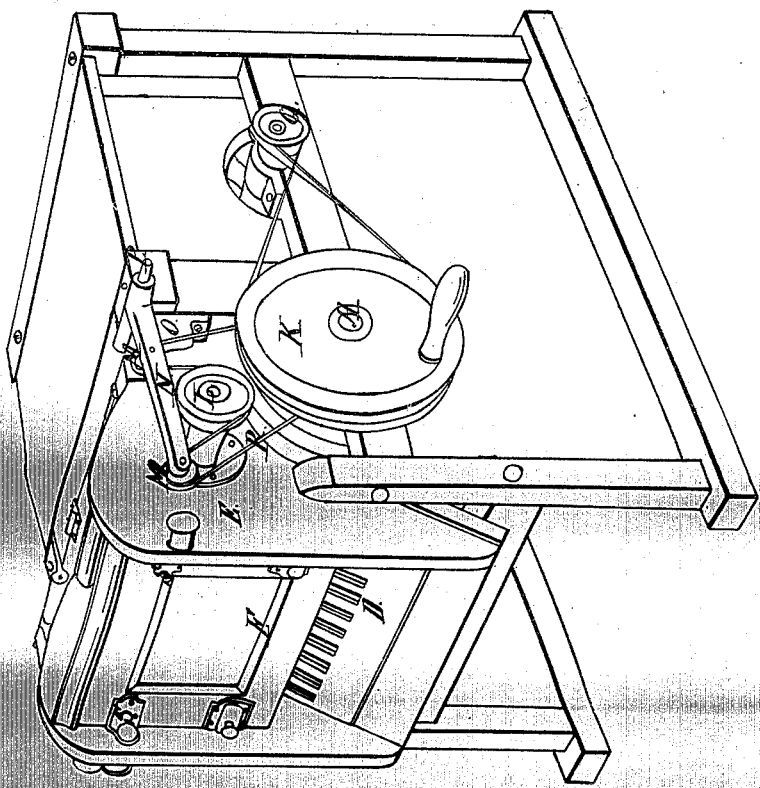
Figure 1 represents, in perspective, my invention.
Figure 1:
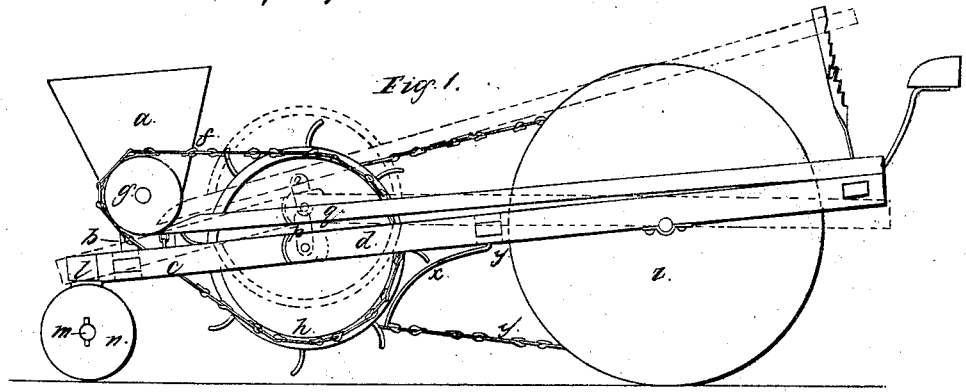

The belt R passes around the pulley L, as shown in fig. 1, and serves to connect it with a pulley on the shaft A, so that the pulley L, and consequently the fluted roller H, must revolve when the other parts of the machine are in motion.

N is a lever, pivoted at P, and carrying the tension-pulleys M M, around which the belt R passes, as shown in fig. 1.

This arm is provided with a spiral spring, not shown in the drawings, which, resting in the hollow bracket O, serves to throw the lever up, and thus keep a constant tension on the belt R.

F is the seed-board, pivoted at S S, so that it may be swung open when desirable.

The fluted roll H is placed at such a distance from the saws and the grate-bars, that it will not admit the tufted seed to drop back between it and the grate, but will permit the seed, after it has been denuded, to fall to the lower part of the hopper, and thence through the opening in the bottom.

The fluted roll H acts upon the mass of seed to revolve it, and to bring each seed, and to subject all parts of the same to the action of the saws.

The process above described, of removing the down or felt from the seed, is entirely distinct from ginning cotton.

This machine takes it after all the cotton is removed, and, by removing the downy covering or felting, which remains on the seed, prepares it for shipment, and also for feeding or making oil, and to prevent its heating when packed in bulk. It also greatly facilitates the operation of planting the seed.

What I claim as my invention, and desire to secure by Letters Patent of the United States, is—

The combination of the roller H, constructed as described, with the saws and hopper, working substantially as described, and for the purpose set forth.

WM. F. PRATT.

Witnesses:
 FRANK G. PARKER,
 A. HUN BERRY.

G. H. Reister,

Seed Sower.

No. 91,867. Patented June 29, 1869.

Witnesses:
J. Smith
L. B. Jones

Inventor:
Geo. H. Reister
by atty T. T. Everett